United States Patent
Motozuka et al.

(10) Patent No.: US 9,775,049 B2
(45) Date of Patent: Sep. 26, 2017

(54) RADIO COMMUNICATION APPARATUS AND INTERFERENCE DETECTION METHOD

(71) Applicant: Panasonic Corporation, Osaka (JP)

(72) Inventors: Hiroyuki Motozuka, Kanagawa (JP); Naganori Shirakata, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 51 days.

(21) Appl. No.: 14/626,873

(22) Filed: Feb. 19, 2015

(65) Prior Publication Data
US 2015/0244475 A1  Aug. 27, 2015

(30) Foreign Application Priority Data

Feb. 26, 2014 (JP) ................................. 2014-035600

(51) Int. Cl.
*H04W 16/14* (2009.01)
*H04B 1/10* (2006.01)

(52) U.S. Cl.
CPC .......... *H04W 16/14* (2013.01); *H04B 1/1036* (2013.01); *H04B 2001/1045* (2013.01)

(58) Field of Classification Search
None
See application file for complete search history.

(56) References Cited

U.S. PATENT DOCUMENTS

| | | | |
|---|---|---|---|
| 2003/0231721 A1 | 12/2003 | Rouphael et al. | |
| 2007/0254590 A1* | 11/2007 | Lopez ................. | H04B 1/1036 455/63.1 |
| 2009/0060006 A1* | 3/2009 | Liu ...................... | H04L 25/022 375/147 |
| 2009/0086837 A1* | 4/2009 | Teng ................... | H04L 27/2647 375/260 |
| 2009/0190641 A1* | 7/2009 | Yang ................... | H04N 17/004 375/224 |
| 2009/0221249 A1* | 9/2009 | Aue .................... | H04B 1/1036 455/192.1 |
| 2012/0243502 A1* | 9/2012 | Lindqvist ........... | H04J 11/0046 370/330 |

FOREIGN PATENT DOCUMENTS

| | | |
|---|---|---|
| JP | 2010-109556 | 5/2010 |
| JP | 2010-521893 | 6/2010 |
| WO | 2008/112928 | 9/2008 |

* cited by examiner

*Primary Examiner* — Steven H Nguyen
(74) *Attorney, Agent, or Firm* — Seed IP Law Group LLP

(57) ABSTRACT

A radio communication apparatus includes a discrete Fourier transformer that performs a frequency-domain transform on each of a plurality of reception signals received at a plurality of receiver chains and generates a plurality of frequency-domain signals, a covariance matrix calculator that calculates covariance of the plurality of frequency-domain signals, a deviation calculator that calculates a cumulative value of covariance in a first frequency range and a second frequency range and calculates deviation of the covariance in the plurality of frequency ranges, and an adjacent-channel interference determiner that determines presence or absence of adjacent-channel interference using the cumulative value of the covariance.

11 Claims, 13 Drawing Sheets

RADIO COMMUNICATION APPARATUS AND INTERFERENCE DETECTION METHOD

BACKGROUND

1. Technical Field

The present disclosure relates to a radio communication apparatus with a function of detecting interference caused by an adjacent-channel signal and to an interference detection method.

2. Description of the Related Art

In recent years, standards for short-distance radio systems that use the 60 GHz band, such as the IEEE802.11ad standard, have been set and each country allocates frequencies to a maximum of four channels.

FIG. 11 illustrates the allocation of radio channels used in IEEE802.1 lad. As illustrated in FIG. 11, four radio channels (ch) are used at the maximum in Japan. The respective specified center frequencies of the channels are 58.32 GHz, 60.48 GHz, 62.64 GHz, and 64.80 GHz while the center frequencies of adjacent ones of the channels are 2.16 GHz apart.

The sampling rate of a single-carrier modulated wave or a transmission signal based on the IEEE802.11ad standard is 1.76 GHz, and under ideal circumstances, no interference occurs among adjacent channels and communication is possible using a plurality of channels at the same time. In an actual transmitter, however, a factor typified by characteristic distortion of a high-frequency circuit, such as an amplifier, causes power leakage to an adjacent channel. The permissible amount of such power leakage is specified as a transmission mask in the IEEE802.11ad standard.

The amount of power leakage from an adjacent channel is generally small. However, when another radio communication apparatus using the adjacent channel comes closer to a radio communication apparatus at a local station, the amount of the power leakage received at the local station from the adjacent channel becomes no more negligible and the quality of communication at the local station is lowered. This is called adjacent-channel interference.

When a radio communication apparatus is affected by adjacent-channel interference, the adjacent-channel interference is controlled so as to be avoided or suppressed. For example, the radio channel that the local station has used is changed to another channel, or another radio communication apparatus, which is an interfering station causing the interference, is requested to reduce transmission power. In another example, when adjacent-channel interference is detected, the characteristics of a reception filter of a receiver at the local station are changed.

To avoid or suppress such interference effectively, it is necessary to detect that adjacent-channel interference is occurring, with high reliability. That is, it is necessary to distinguish the interference from another kind of interference, such as co-channel interference. It is also necessary to identify the radio channel that the interfering station uses.

A technique for detecting interference caused by an adjacent-channel signal uses measurement of a spectrum of an undesired signal as discussed in, for example, U.S. Pat. No. 7,039,093. Another technique, which is for determining whether the adjacent-channel interference is from a high-frequency channel or a low-frequency channel, uses a high-pass filter to extract interference wave components as discussed in, for example, Japanese Unexamined Patent Application Publication (Translation of PCT Application) No. 2010-521893.

SUMMARY

One non-limiting and exemplary embodiment provides a radio communication apparatus, which enables the presence or absence of adjacent-channel interference to be determined with high reliability.

In one general aspect, the techniques disclosed here feature a radio communication apparatus, which includes a frequency-domain transfer that performs a frequency-domain transform on each of a plurality of reception signals received at a plurality of receiver chains and generates a plurality of frequency-domain signals, a covariance calculator that calculates covariance of the plurality of frequency-domain signals, a cumulative value calculator that calculates a cumulative value of the covariance, and a determiner that determines presence or absence of adjacent-channel interference using the cumulative value of the covariance.

According to the present disclosure, the presence or absence of adjacent-channel interference may be determined with high reliability.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

[Underlying Knowledge Forming Basis of Embodiments of the Present Disclosure]

Prior to describing embodiments of a radio communication apparatus and an interference detection method according to the present disclosure, what is desired to be addressed in detecting adjacent-channel interference is described first.

Figure 12:
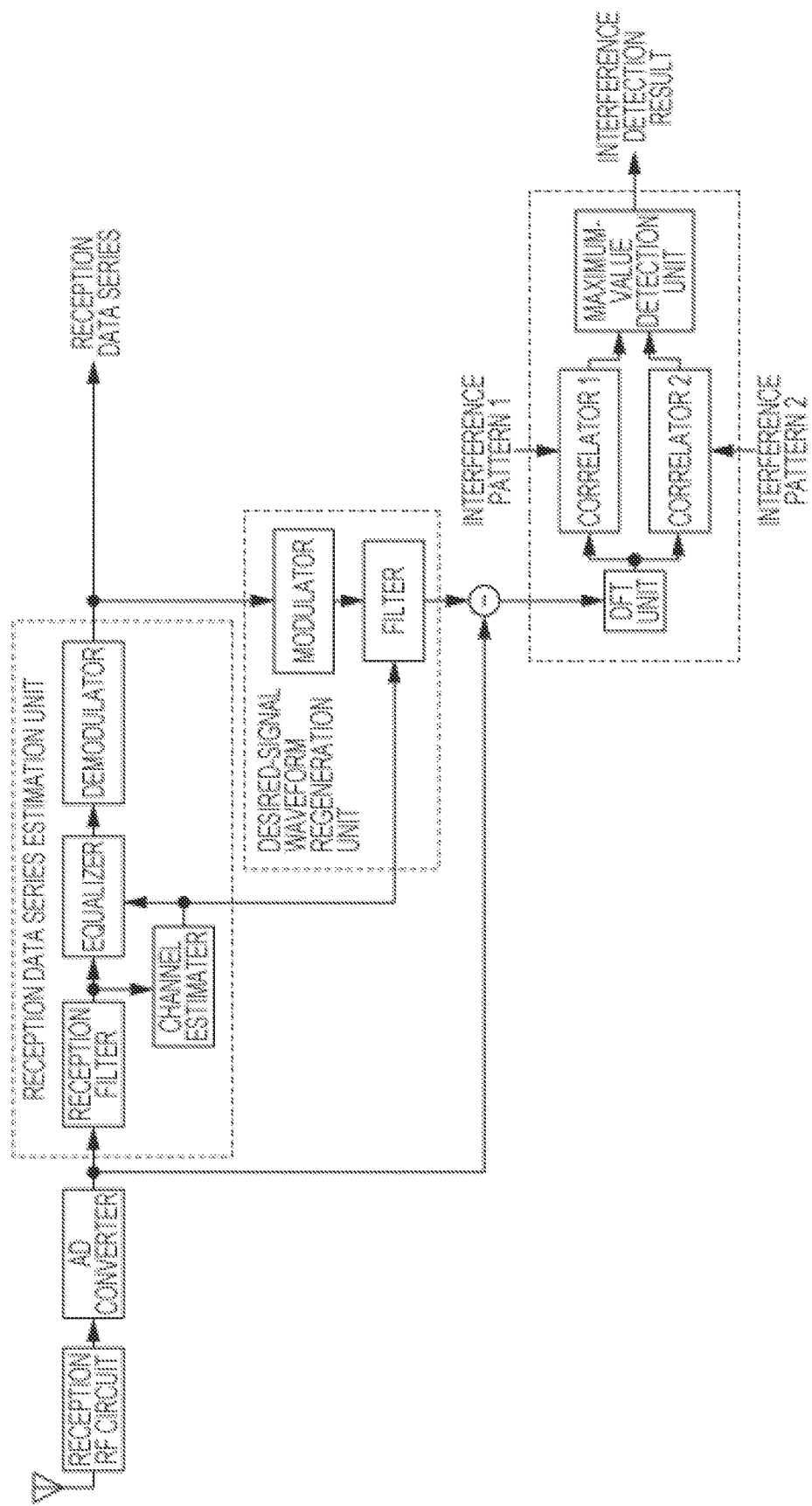
FIG. 12 illustrates a configuration of a radio communication apparatus with a conventional function of detecting interference caused by an adjacent-channel signal.

FIG. 12 illustrates a configuration of a radio communication apparatus with a conventional function of detecting interference caused by an adjacent-channel signal, which is discussed in U.S. Pat. No. 7,039,093 mentioned above.

In the radio communication apparatus in FIG. 12, a reception data series estimation unit includes a reception filter, a channel estimater, an equalizer, and a demodulator, and calculates an estimated value of a reception data series. A desired-signal waveform regeneration unit includes a modulator and a filter, and regenerates a reception waveform of a signal transmitted from a desired station. A subtractor (−) regenerates an undesired signal including an interference wave and noise by subtracting a signal with the regenerated waveform, which has been output by the desired-signal waveform regeneration unit, from a reception signal output by an analog-to-digital (AD) converter.

A discrete Fourier transform (DFT) unit performs a discrete Fourier transform on the regenerated undesired signal and calculates the spectrum of the undesired signal. A correlator 1 calculates a value of correlation with an interference pattern of adjacent-channel interference, which is stored in a receiver in advance as an interference pattern 1. A correlator 2 calculates a value of correlation with an interference pattern of co-channel interference, which is stored in the receiver in advance as an interference pattern 2. A maximum-value detection unit compares the magnitudes of the two calculated correlation values and outputs the resultant as an interference detection result.

With reference to the interference detection result output from the maximum-value detection unit, the radio communication apparatus determines that adjacent-channel interference is present when the output of the correlator 1 is large, or that co-channel interference is present when the output of the correlator 1 is small.

Figure 13:
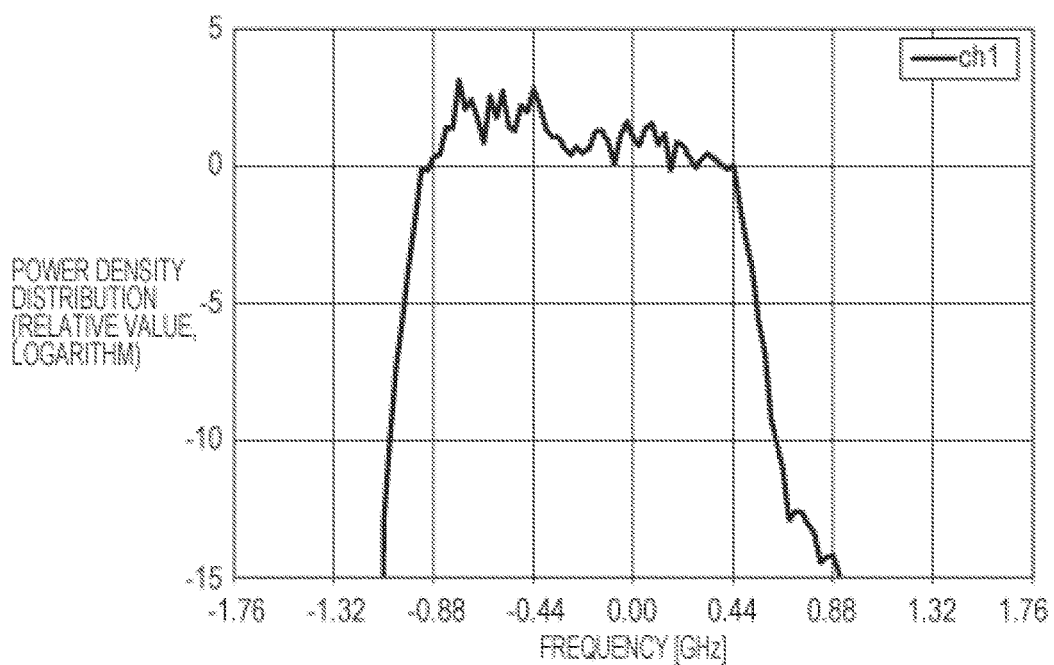
FIG. 13 illustrates an example of power spectral density distribution of a measured undesired signal.

FIG. 13 illustrates an example of the power spectral density distribution of a measured undesired signal. In FIG. 13, the power spectral density distribution of an interference wave from a radio channel 1 is indicated, which is observed in a radio channel 2. The power spectral waveform in FIG. 13 is obtained by performing simulation on an interference signal while the channel used by the interfering station is referred to as the radio channel 1 and the desired-signal receiving channel is referred to as the radio channel 2. Since the power spectrum is computed in a baseband region, the center of frequencies is 0 GHz.

As illustrated in FIG. 13, power falls when the frequency is equal to or larger than +0.44 GHz. As for the frequencies equal to or lower than −0.44 GHz, large power is observed approximately between −0.44 GHz and −0.88 GHz. An interference wave caused by an adjacent-channel signal involves power spectral distribution, where power falls at a certain frequency or more. The conventional radio communication apparatus illustrated in FIG. 12 obtains correlation with a known interference pattern and detects characteristics of power spectral distribution to detect adjacent-channel interference.

According to the configuration of the conventional radio communication apparatus, when the power of an interference wave is smaller than or as large as the power of noise, the power spectral waveform of an undesired signal may be flat and a correlator may fail to obtain a correlation value that has a peak, and as a result, the detection error rate may increase.

Figure 14:
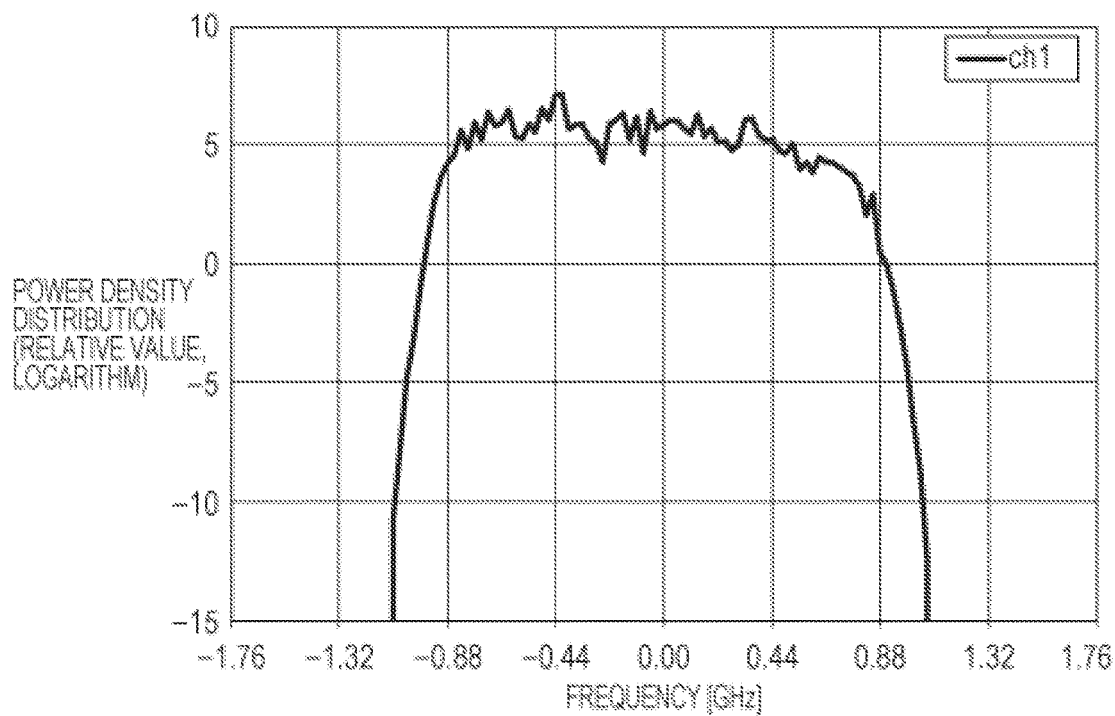
FIG. 14 illustrates an example of power spectral density distribution of an undesired signal in a case where power of noise and power of an adjacent-channel interference wave are approximately the same.

FIG. 14 illustrates an example of the power spectral density distribution of an undesired signal in a case where the power of noise and the power of an adjacent-channel interference wave are approximately the same. FIG. 14 indicates the power spectral density distribution of the sum of an interference wave and noise from the radio channel 1, which are observed in the radio channel 2.

In the power spectral waveform in FIG. 14, compared to FIG. 13, the degree of the fall in power is less noticeable at a frequency of +0.44 GHz or more. Accordingly, with the configuration of the conventional radio communication apparatus, it is difficult to detect the presence of adjacent-channel interference for a power spectral waveform like the power spectral waveform depicted in FIG. 14, with high reliability.

In view of the respects described above, the present disclosure provides a radio communication apparatus and an interference detection method, which enable adjacent-channel interference to be detected with high reliability even when noise is present, and examples of the radio communication apparatus and the interference detection method are described below.

[Embodiments of the Present Disclosure]

Embodiments of the present disclosure are described in detail with reference to the drawings. Regarding the figures used in the description below, the same reference numerals or symbols are given to the same constituents and the explanation on such constituents is omitted.

[First Embodiment]

Figure 1:
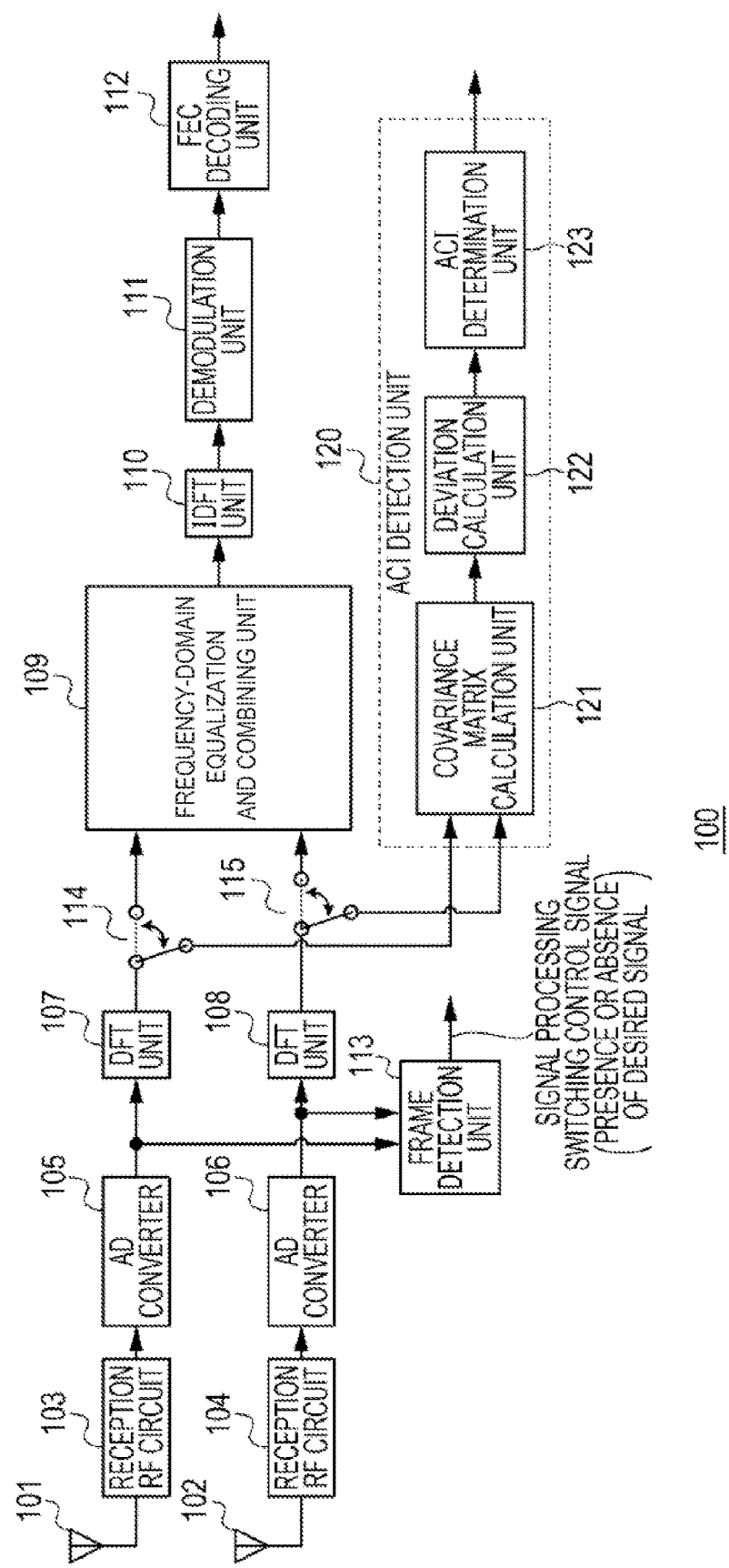
FIG. 1 illustrates a configuration of a radio communication apparatus according to a first embodiment of the present disclosure.

FIG. 1 illustrates a configuration of a radio communication apparatus according to a first embodiment of the present disclosure.

In FIG. 1, a radio communication apparatus 100 includes antennas 101 and 102, reception radio-frequency (RF) circuits 103 and 104, AD converters 105 and 106, and DFT units 107 and 108 in two reception chains. Further, the radio communication apparatus 100 includes a frequency-domain equalization and combining unit 109, an inverse discrete Fourier transform (IDFT) unit 110, a demodulation unit 111, a forward error-correction code (FEC) decoding unit 112, a frame detection unit 113, switches 114 and 115, a covariance matrix calculation unit 121, a deviation calculation unit 122, and an adjacent-channel interference (ACI) determination unit 123. The covariance matrix calculation unit 121, the deviation calculation unit 122, and the ACI determination unit 123 function as an ACI detection unit 120.

The antenna 101, the reception RF circuit 103, and the AD converter 105 are constituents for obtaining a first reception signal. The antenna 102, the reception RF circuit 104, and the AD converter 106 are constituents for obtaining a second reception signal.

The frame detection unit 113 has a function of a desired-signal determination unit, and with reference to the first and second reception signals, detects that a desired signal, which is a signal with a desired wave from a desired station, is received at a channel of a reception target. Examples of the detection of a desired signal in the frame detection unit 113 include measuring the strength of power and detecting the pattern of a preamble in a reception signal. The frame detection unit may be also referred to as, for example, a power detection unit, a preamble detection unit, a burst detection unit, or a packet detection unit.

The DFT units 107 and 108 each have a function of a frequency-domain transform unit, and perform a discrete Fourier transform on the first reception signal and the second reception signal, respectively, for conversion into frequency-domain signals.

The computation of the frequency-domain transform performed by the DFT units 107 and 108 is expressed in mathematical equation 1.

$$u(m, k, b) = \sum_{j=0}^{N-1} x(m, Nb + j) e^{-2\pi i \left(\frac{jk}{N}\right)}$$ [Mathematical Equation 1]

In mathematical equation 1, m represents a reception antenna number. The reception antenna number m indicating 1 corresponds to the DFT unit 107 and the reception antenna number m indicating 2 corresponds to the DFT unit 108. When t represents an integer equal to or more than 0, x(m,t) indicates the reception antenna m and the t-th signal sequence. That is, x(1,t) indicates an output signal sequence of the AD converter 105 and x(2,t) indicates an output signal sequence of the AD converter 106.

Further, in mathematical equation 1, N, which is an integer equal to or more than 1, represents the length of the DFT and b, which is an integer equal to or more than 0, represents a block number.

Figure 2:
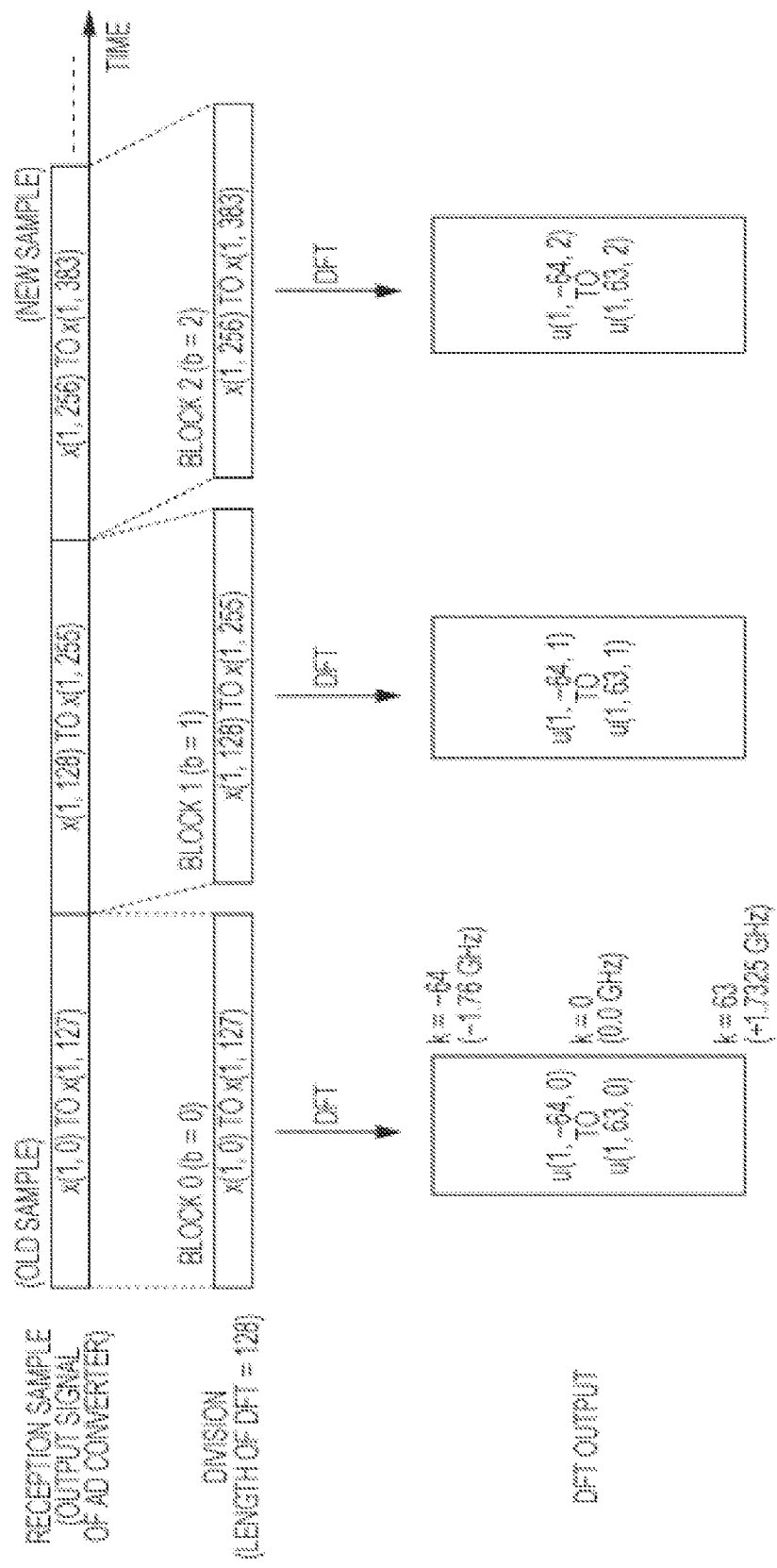
FIG. 2 illustrates a concept of block division of discrete Fourier transform (DFT) in the first embodiment.

FIG. 2 illustrates a concept of block division of the DFT in the present embodiment. As illustrated in FIG. 2, the DFT units 107 and 108 divide the signal sequence x(m,t) of received samples that has been input into blocks, which each have the length N, and perform DFT computation. In the example of FIG. 2, the block length N is equal to 128.

Further, in mathematical equation 1, k represents a frequency number and is an integer that is 0 or more and is less than N. Additionally, in mathematical equation 1, e represents Napier's constant, π represents the ratio of a circle's circumference to its diameter, and i represents a unit of an imaginary number.

The implementation of the computation of the frequency-domain transform performed by the DFT units 107 and 108 is not limited to mathematical equation 1 described above and another method known as the DFT may be also used. For example, a method of dividing the right side of mathematical equation 1 by N is known. As another example, a fast Fourier transform (FFT), which is almost equivalent to the DFT, may be also used.

Some explanation about the frequency number k is added below. Although in a typical DFT computation, k is defined as an integer that is 0 or more and is less than N while N represents the length of the DFT, in the description below, k is defined as an integer that is −N/2 or more and is less than N/2 for convenience. When k indicates a negative value, the value of u(m,k,b) is equal to the value of u(m,k+N,b). Due to the above-described definitions, the value of k equal to 0, which corresponds to 0 Hz, is indicated at the center in a calculation example of covariance illustrated in FIG. 3, which is described below, and the explanation is simplified accordingly.

The processing for the frequency-domain signals calculated by the DFT units 107 and 108 differs, depending on whether or not a desired signal is detected in the frame detection unit 113. In the radio communication apparatus 100 of the present embodiment, the signal processing is changed, depending on the detection or no detection of the desired signal. For example, a signal processing switching control signal corresponding to the desired-signal detection result of the frame detection unit 113 is supplied to the switches 114 and 115 and the switches 114 and 115 are turned on or off. Thus, depending on the detection or no detection of the desired signal, the outputs of the DFT units 107 and 108 are selectively input to the frequency-domain equalization and combining unit 109 or the covariance matrix calculation unit 121.

[Operation Performed when the Desired Signal is Detected]

When the desired signal is detected, the switches 114 and 115 are coupled to the frequency-domain equalization and combining unit 109 and the frequency-domain signals calculated by the DFT units 107 and 108 are input to the frequency-domain equalization and combining unit 109.

The frequency-domain equalization and combining unit 109 estimates a signal with a desired wave, which is a reception data series obtained by removing disturbance factors caused in a propagation path and a transmission and reception circuit, such as noise, distortion, or fading, from the frequency-domain signals that have been input. Examples of the estimation method that is usable include a minimum mean squared error (MMSE) method, a maximum likelihood detection (MLD) method, and an interference canceller method.

When the MMSE method is used, the frequency-domain equalization and combining unit 109 multiplies each of the frequency-domain signals output from the DFT units 107 and 108 through the two chains by a weighting factor, adds the multiplication results, and calculates the estimated value of the transmission signal. The estimated signal is input to the IDFT unit 110.

The IDFT unit 110 performs an IDFT on the estimated signal and converts the signal into a time-domain signal. The demodulation unit 111 generates a signal called likelihood information by performing a demodulation processing on the output of the IDFT unit 110. The FEC decoding unit 112 performs error-correction decoding on the likelihood information and calculates the estimated value of the transmitted data.

[Operation Performed when the Desired Signal is not Detected]

When the desired signal is not detected, the switches 114 and 115 are coupled to the covariance matrix calculation unit 121 and the frequency-domain signals calculated by the DFT units 107 and 108 are input to the covariance matrix calculation unit 121.

The covariance matrix calculation unit 121 has a function of a covariance calculation unit and calculates a covariance matrix $R_{uu}(k)$ defined by mathematical equations 2 and 3.

$$R_{uu}(k) = \begin{bmatrix} c(k, 1, 1) & c(k, 1, 2) \\ c(k, 2, 1) & c(k, 2, 2) \end{bmatrix}$$ [Mathematical Equation 2]

$$c(k, m_1, m_2) = E[u(m_1, k, b) \times u^*(m_2, k, b)] = \frac{1}{B} \sum_{b=0}^{B-1} u(m_1, k, b) \times u^*(m_2, k, b)$$ [Mathematical Equation 3]

In the right side on the first line of mathematical equation 3, the operator E[•] denotes the expectation and the superscript * represents the complex conjugate. In an actual computation, as indicated on the second line of mathematical equation 3, in a case where B DFT blocks are received while B represents the number of DFT blocks and b=0, 1, 2, . . . , or B−1, covariance is calculated for each block and an average is calculated.

In the covariance matrix $R_{uu}(k)$ in mathematical equation 2, diagonal elements indicate the respective power spectra of the reception signals of the reception antennas while off-diagonal elements indicate the correlation between the reception signals of the two reception antennas.

In the first embodiment, one of the off-diagonal elements in the obtained covariance matrix, which is c with m1 and m2 that have different values. Here, c(k,1,2) is calculated. In other words, the covariance of the outputs of the DFT units 107 and 108 is calculated.

The deviation calculation unit 122 has a function of a cumulative value calculation unit, calculates the cumulative value of the obtained covariance, and calculates the degree of the deviation of the covariance. Here, the deviation calculation unit 122 calculates the absolute value of the covariance c(k,1,2) obtained using mathematical equation 3 and further, for a predetermined range of the frequency k, calculates the total value of the calculated absolute values.

A first frequency range for which the deviation calculation unit 122 calculates a total value corresponds to frequencies, which are +0.44 GHz or more and are less than +1.76 GHz. A total value $R_H$ of the first frequency range is calculated using mathematical equation 4.

$$R_H = \sum_{k=K_H}^{K_{max}-1} |c(k, 1, 2)|$$ [Mathematical Equation 4]

In mathematical equation 4, $K_H$ represents a value of k, which corresponds to +0.44 GHz, and $K_{max}$ represents a value of k, which corresponds to +1.76 GHz.

A second frequency range for which the deviation calculation unit 122 calculates a total value corresponds to frequencies, which are −0.44 GHz or less and are −1.76 GHz or more. A total value $R_L$ in the second frequency range is calculated using mathematical equation 5.

$$R_L = \sum_{k=K_{min}}^{K_L} |c(k, 1, 2)|$$ [Mathematical Equation 5]

In mathematical equation 5, $K_L$ represents a value of k, which corresponds to −0.44 GHz, and $K_{min}$ represents a value of k, which corresponds to −1.76 GHz.

A third frequency range for which the deviation calculation unit 122 calculates a total value corresponds to frequencies, which are −1.76 GHz or more and are less than +1.76 GHz, that is, the whole of the band. A total value R in the third frequency range may be calculated using mathematical equation 6.

$$R = \sum_{k=K_{min}}^{K_{max}-1} |c(k, 1, 2)|$$ [Mathematical Equation 6]

In an example, the DFT length N is set to 128, $K_H$ is set to 16, $K_L$ is set to −15, $K_{max}$ is set to 63, and $K_{min}$ is set to −64.

In another example, the DFT length N is set to 128, $K_H$ is set to 16, $K_L$ is set to −15, $K_{max}$ is set to 39, and $K_{min}$ is set to −40. This corresponds to that the first frequency range is set for frequencies of +0.44 GHz or more and less than +1.10 GHz, the second frequency range is set for frequencies of −0.44 GHz or less and −1.10 GHz or more, and the third frequency range is set for frequencies of −1.10 GHz or more and less than +1.10 GHz.

The ACI determination unit 123 has a function of a determination unit and determines the presence or absence of adjacent-channel interference, depending on whether or not conditions 1 and 2 described below are satisfied for each of the covariance deviations $R_H$, $R_L$, and R calculated by the deviation calculation unit 122.

Condition 1: The ratio between $R_H$ and R ($R_H/R$) is smaller than a predetermined threshold value and the ratio between $R_L$ and R ($R_L/R$) is larger than a predetermined threshold value Th.

Condition 2: The ratio between $R_H$ and R ($R_H/R$) is larger than the predetermined threshold value and the ratio between $R_L$ and R ($R_L/R$) is smaller than the predetermined threshold value Th.

The ACI determination unit 123 determines that adjacent-channel interference on the low-frequency side is present when condition 1 is satisfied. When condition 2 is satisfied, the ACI determination unit 123 determines that adjacent-channel interference on the high-frequency side is present. When neither condition 1 nor condition 2 is satisfied, the ACI determination unit 123 determines that no adjacent-channel interference is present.

Figure 4:
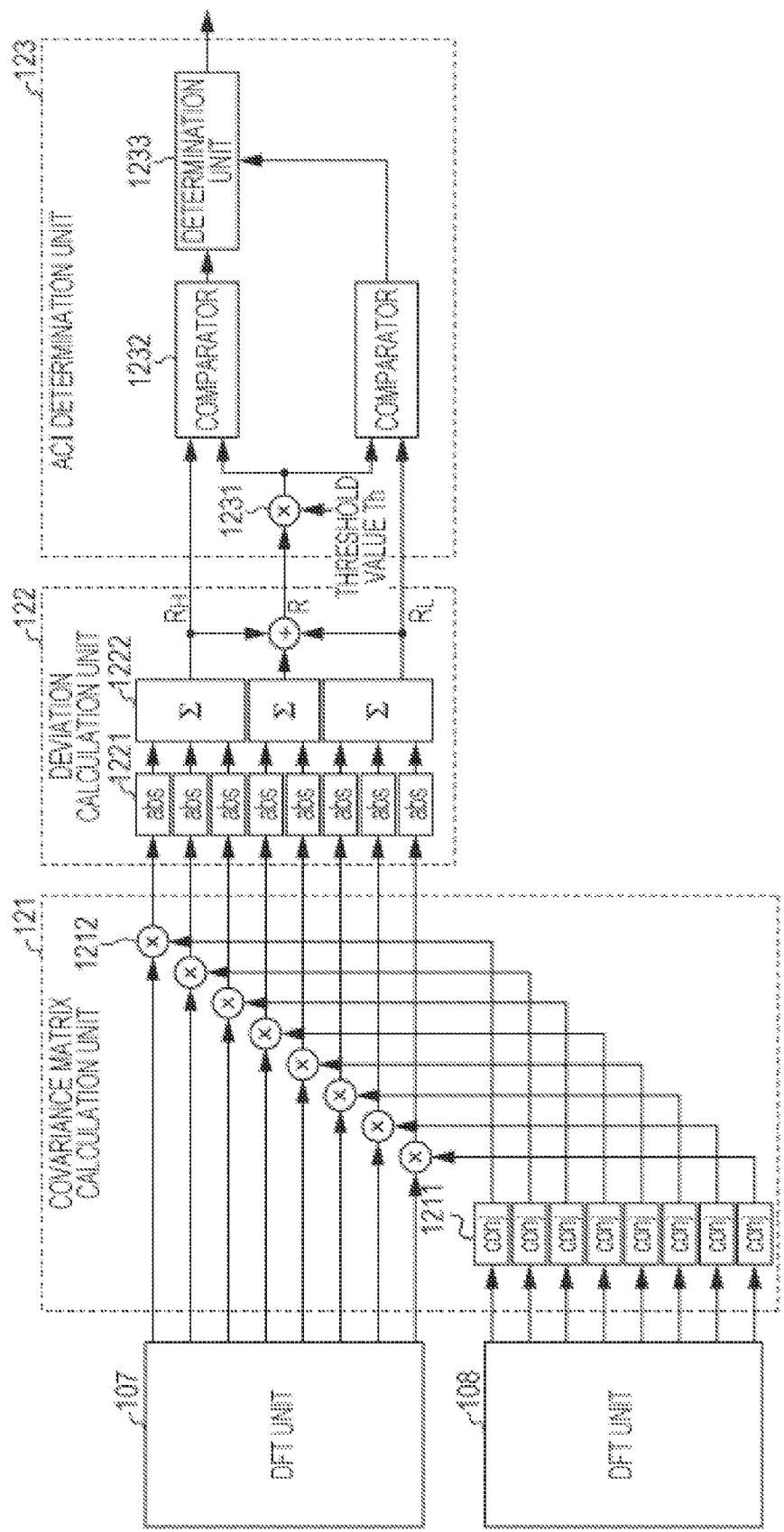
FIG. 4 illustrates a configuration example of an adjacent-channel interference (ACI) detection unit in the radio communication apparatus according to the first embodiment.

FIG. 4 illustrates a configuration example of the ACI detection unit in the radio communication apparatus according to the first embodiment. In FIG. 4, specific examples of the covariance matrix calculation unit 121, the deviation calculation unit 122, and the ACI determination unit 123 are depicted as the configuration example of the ACI detection unit 120 in FIG. 1.

Referring to FIG. 4, the configuration and operation of the ACI detection unit 120 are described below in more detail.

The covariance matrix calculation unit 121 includes a complex conjugate calculation unit (conj) 1211 and a complex multiplier (×) 1212, and calculates c(k,1,2) using mathematical equation 3. The covariance matrix calculation unit 121 performs a complex multiplication on the output of the DFT unit 107 and the complex conjugate of the output of the DFT unit 108, and calculates the covariance matrix c(k,1,2). The numbers of the complex conjugate calculation units 1211 and the complex multipliers 1212 may each be plural for parallel processing. FIG. 4 illustrates a configuration for eight parallel processes. That is, computation is performed on eight ks concurrently at one timing.

The deviation calculation unit 122 includes an amplitude calculation unit (abs) 1221, and a cumulative addition unit (Σ) 1222. The amplitude calculation unit 1221 calculates the absolute value of c(k,1,2). As an approximate value of the absolute value, the resultant value after adding the absolute values of a real part and an imaginary part may be also used. Instead of the absolute value, a square value may be also used.

The cumulative addition unit 1222 performs cumulative additions of the amplitudes or the absolute values of c(k,1,2) of the first, second, and third frequency ranges using mathematical equations 4, 5, and 6, respectively, and calculates the respective covariance deviations $R_H$, $R_L$, and R of the first, second, and third frequency ranges.

With reference to the respective covariance deviations $R_H$, RL, and R of the first, second, and third frequency ranges, which have been calculated in the deviation calculation unit 122, the ACI determination unit 123 determines whether or not above-described conditions 1 and 2 are satisfied. Here, the ACI determination unit 123 includes a multiplier (×) 1231, a comparator 1232, and a determination unit 1233, and determines whether or not conditions 1 and 2 are satisfied, with reference to $R_H$, $R_L$, and R and the predetermined threshold value Th.

In the determination of condition 1 and 2, instead of using a divider to compare $R_H/R$ with Th, a multiplier may be used to compare $R_H$ with R×Th. In the configuration example illustrated in FIG. 4, the multiplier 1231 is used. Similarly, instead of using a divider to compare $R_L/R$ with Th, a multiplier may be used to compare $R_L$ with R×Th. In the configuration example illustrated in FIG. 4, the multiplier 1231 is used.

According to the above-described computations, the ACI determination unit 123 determines whether or not conditions 1 and 2 are satisfied, and outputs the determination result regarding the presence or absence of adjacent-channel interference.

Advantages of the configuration according to the first embodiment are now described by taking the determination of adjacent-channel interference, which is based on the above-described mathematical equations and conditions, as an example.

In this example, the radio channel 2 is the reception channel of the desired signal and a combination of an interference signal and noise from the radio channel 1 is received. In other words, in this example, adjacent-channel interference on the low-frequency side is present and besides noise is present. The conditions in the present example are the same as the conditions of FIG. 14.

Figure 3:
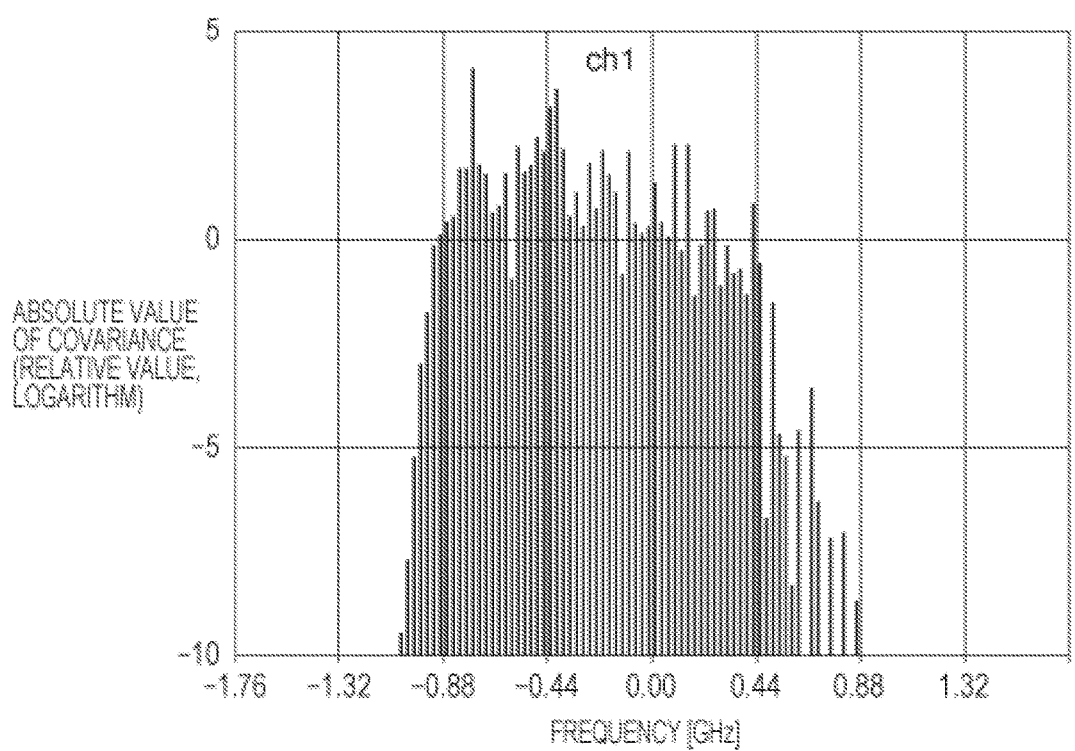
FIG. 3 illustrates a calculation example of covariance for detecting adjacent-channel interference in the first embodiment.

FIG. 3 illustrates a calculation example of covariance for detecting adjacent-channel interference in the first embodiment. FIG. 3 is an example of a graph, where the absolute values of c(k,1,2) calculated using mathematical equation 3 are plotted. In FIG. 3, the horizontal axis indicates a frequency instead of indicating the value of k. For example, it corresponds to 0.00 GHz that k=0, it corresponds to +0.44 GHz that k=16, and it corresponds to −0.44 GHz that k=−15.

Figures 5, 6:
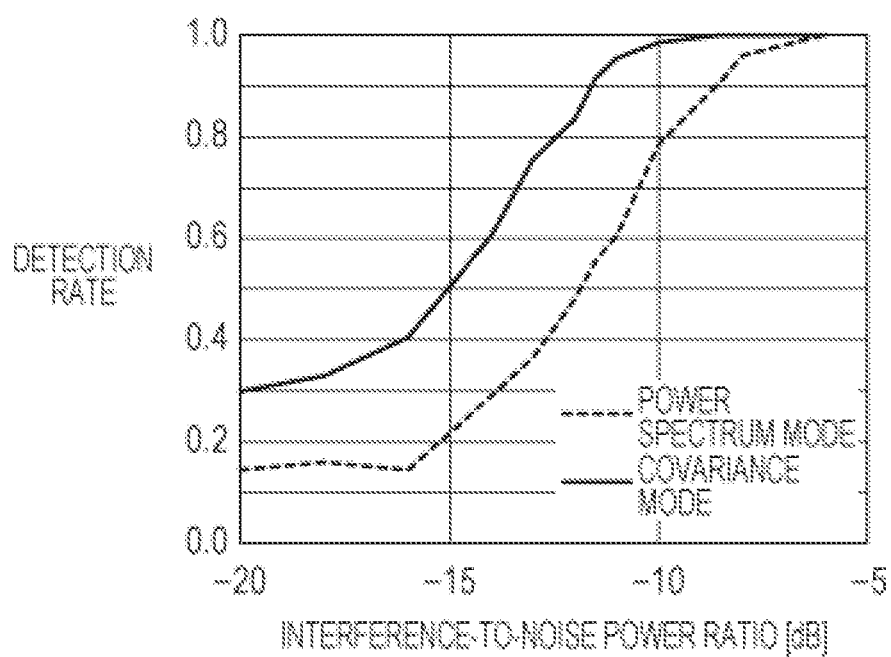
FIG. 5 illustrates examples of calculation results of covariance deviations.
FIG. 6 illustrates evaluation results of detection rates of adjacent-channel interference in the first embodiment.

FIG. 5 illustrates examples of the calculation results of the covariance deviations $R_H$, $R_L$, and R. The calculation results of the covariance deviations $R_H$, $R_L$, R, $R_H/R$, and $R_L/R$ are indicated in the chart of FIG. 5. The threshold value Th is 0.25.

At this time, since the ratio between $R_H$ and R is smaller than the threshold value Th and the ratio between $R_L$ and R is larger than the threshold value Th, condition 1 is satisfied. Accordingly, the ACI determination unit 123 may correctly determine that adjacent-channel interference on the low-frequency side is present.

As illustrated in FIG. 14, with a conventional configuration, the presence of noise inhibits correct determination of the presence of adjacent-channel interference. In contrast, according to the present embodiment, the presence of adjacent-channel interference may be determined correctly without depending on the presence of noise. When the covariance is calculated as described in the present embodiment, the correlation between the reception signals of the two chains may be obtained from the covariance, and the obtained correlation enables interference components to be extracted. In addition, since noise components have no correlation, the covariance enables the noise components to be removed.

When the correlation between the reception signals of the two chains is small, equalization enables interference components to be cancelled. Thus, according to the present embodiment, the interference components that are unable to be cancelled through the equalization may be detected using the covariance.

FIG. 6 illustrates the evaluation results of the detection rates of adjacent-channel interference in the first embodiment. FIG. 6 indicates the results obtained when the simulation evaluation of the detection rates of adjacent-channel interference is performed.

When the interference-to-noise power ratio is −10 dB, the detection rate in a conventional mode using a power spectrum, which is indicated with a broken line, is 79% while the detection rate in a mode using covariance according to the present embodiment, which is indicated with a solid line, is 99%. As described above, even when the power of noise is large, compared to the interference power, the presence of adjacent-channel interference may be detected with few detection errors and high reliability by using the configuration according to the present embodiment.

As described above, in the first embodiment, the absolute values of the covariance of the outputs of the DFT units 107 and 108 are obtained and the obtained values are summed on a frequency-range basis to determine the total values of the first, second, and third frequency ranges as the first total value $R_H$, the second total value $R_L$, and the third total value R, respectively, and then the covariance deviations $R_H$, $R_L$, and R are calculated. After that, the presence of adjacent-channel interference is determined using the ratio between the first total value $R_H$ and the third total value R, and the ratio between the second total value $R_L$ and the third total value R. As a result, the presence of adjacent-channel interference may be determined with high reliability while reducing the influence of noise and enhancing the determination reliability of adjacent-channel interference.

Although in the ACI determination unit 123 according to the first embodiment, the ratio between $R_H$ and R and the ratio between $R_L$ and R are used to determine the presence of adjacent-channel interference, other values that are substantially equivalent may be also used. For example, the ratio between $R_H$ and $(R-R_H)$ and the ratio between the $R_L$ and $(R-R_L)$ may be also used. Since $(R-R_H)$ indicates the sum total of the part that does not include $R_H$, the computation processing in this example may be performed more easily than the computation processing using R. As another example, the presence or absence of adjacent-channel interference may be determined by comparing $R_H$ and $R_L$ and detecting the deviation of the cumulative values of the covariance in the radio channel.

The respective frequency ranges of $R_H$, $R_L$, and R are not limited to the above-described example and only when the deviation of the covariance at high frequencies or low frequencies in the radio channel may be calculated, other variations are conceivable.

Instead of using ratios, for example, it may be determined whether or not $R_H$ and $R_L$ exceed a predetermined threshold value. This corresponds to that R is regarded as a constant. The method that uses a constant instead of R is described below in a second embodiment. Further, the sum total of the cumulative values of the covariance in the radio channel enables adjacent-channel interference to be determined using R for example.

Although the first embodiment describes the method where computation is performed on reception signals of two chains while two AD converters are arranged, similar configuration is applicable when the number of chains is three or more.

When there are three chains or more for reception signals, the number of lines and the number of columns in the covariance matrix defined by mathematical equation 2 increase. For example, when the number of chains is three, both the number of lines and the number of columns are three in the matrix as indicated in mathematical equation 7.

$$R_{uu}(k) = \begin{bmatrix} c(k,1,1) & c(k,1,2) & c(k,1,3) \\ c(k,2,1) & c(k,2,2) & c(k,2,3) \\ c(k,3,1) & c(k,3,2) & c(k,3,3) \end{bmatrix}$$ [Mathematical Equation 7]

The computation that the deviation calculation unit 122 performs when the number of chains is three employs any one of the methods described below.

Method 1: The computation based on mathematical equations 4 to 6 is performed by selecting an arbitrary element from the off-diagonal elements in the covariance matrix. For example, c(k,1,2) is selected fixedly. As another example, an element different from the element selected previously may be selected each time the determination of adjacent-channel interference is performed. As another example, random selection is performed. As another example, when adjacent-channel interference is detected in the preceding determination, the same element as the element of the preceding determination may be used and when no adjacent-channel interference is detected in the preceding determination, another element may be used.

Method 2: One of the off-diagonal elements in the covariance matrix, which has a large absolute value, is selected and the computation based on mathematical equations 4 to 6 is performed.

Method 3: The computation based on mathematical equations 4 to 6 is performed on the sum or the average of the off-diagonal elements in the covariance matrix.

Method 4: The computation of R is performed for each of the off-diagonal elements in the covariance matrix using mathematical equation 6, and the computation based on mathematical equations 4 and 5 is performed using the element that has the largest value.

Method 5: The computation based on mathematical equations 4 to 6 is performed for each of the off-diagonal elements in the covariance matrix and the determination of adjacent-channel interference is performed for each of the resultant values for total determination. In the total determination, for example, adjacent-channel interference is regarded as being present when adjacent-channel interference is detected in a half or more of the off-diagonal elements in accordance with a majority rule, or when adjacent-channel interference is detected for at least one time.

[Second Embodiment]

Figure 7:
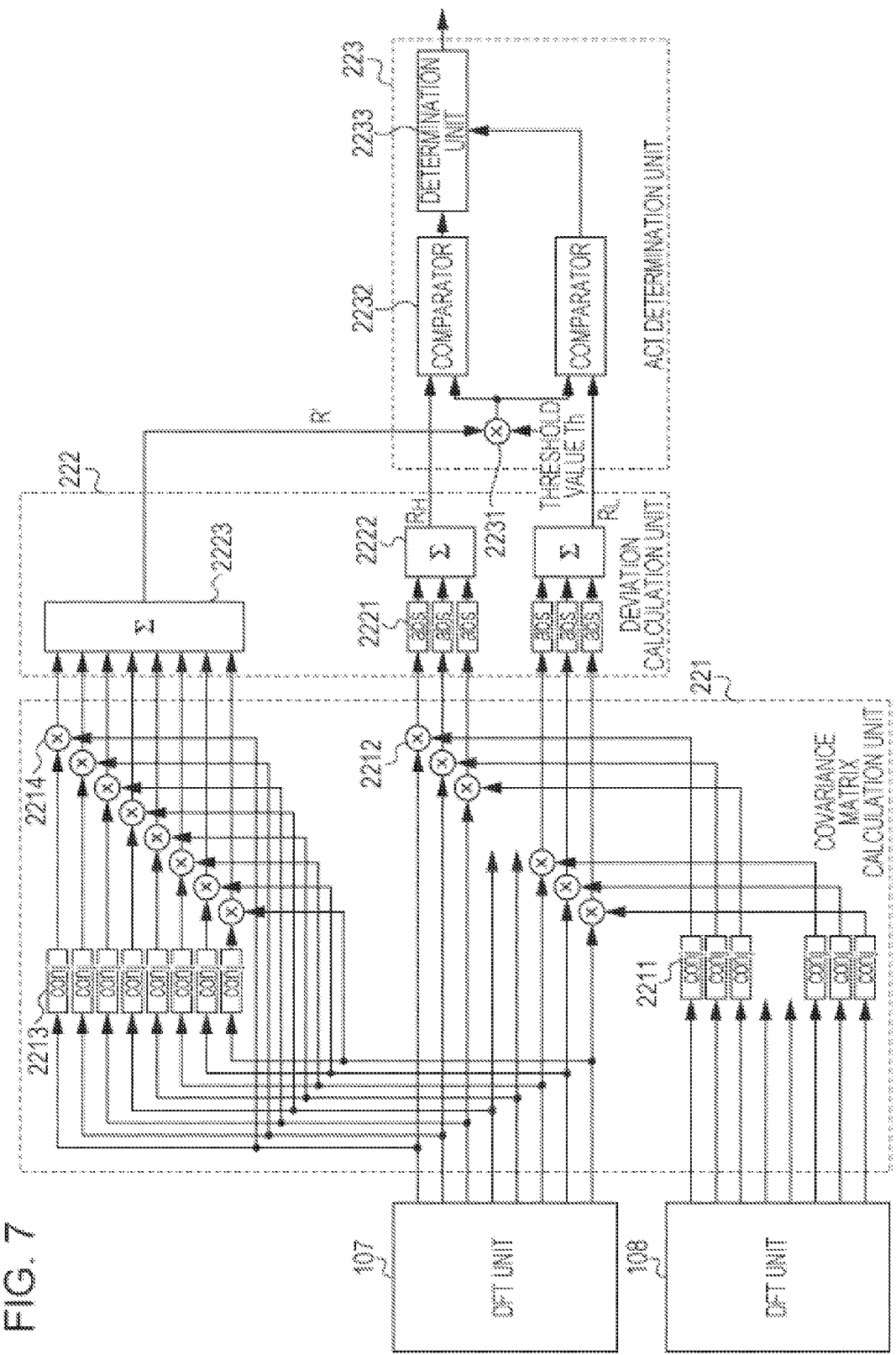
FIG. 7 illustrates a configuration example of an ACI detection unit in a radio communication apparatus according to a second embodiment.

FIG. 7 illustrates a configuration example of an ACI detection unit in a radio communication apparatus according to the second embodiment of the present disclosure.

The second embodiment provides another configuration example of the ACI detection unit and employs a configuration with a different covariance matrix calculation unit, a different deviation calculation unit, and a different ACI determination unit in comparison with the first embodiment.

Below described are parts different from the configuration according to the first embodiment and the explanation on the other parts is omitted.

As another configuration example of the ACI detection unit, FIG. 7 illustrates specific examples of a covariance matrix calculation unit 221, a deviation calculation unit 222, and an ACI determination unit 223.

The covariance matrix calculation unit 221 includes complex conjugate calculation units (conj) 2211 and 2213, and complex multipliers (×) 2212 and 2214, and calculates c(k,1,1) and c(k,1,2) using mathematical equation 3. That is, the second embodiment is different from the first embodiment in that c(k,1,1) is also calculated in addition to c(k,1,2). Here, c(k,1,1) is referred to as a power spectrum.

The covariance matrix calculation unit 221 performs a complex multiplication on the output of a DFT unit 107 and the complex conjugate of the output of a DFT unit 108, and calculates the covariance matrix c(k,1,2). Further, the covariance matrix calculation unit 221 performs a complex multiplication on the output of the DFT unit 107 and the complex conjugate of the output of the DFT unit 107, and calculates the covariance matrix c(k,1,1). The numbers of the complex conjugate calculation units 2211 and 2213 and the complex multipliers 2212 and 2214 may each be plural for parallel processing. FIG. 7 illustrates a configuration for eight parallel processes. That is, computation is performed on eight ks concurrently at one timing.

The deviation calculation unit 222 includes an amplitude calculation unit (abs) 2221, and cumulative addition units (Σ) 2222 and 2223. The amplitude calculation unit 2221 calculates the absolute value of c(k,1,2). As an approximate value of the absolute value, the resultant value after adding the absolute values of a real part and an imaginary part may be also used. Instead of the absolute value, a square value may be used.

The cumulative addition unit 2222 performs cumulative additions of the amplitudes (the absolute values) of c(k,1,2) of the first and second frequency ranges using mathematical equations 4 and 5, respectively, and calculates respective covariance deviations $R_H$ and $R_L$ of the first and second frequency ranges. Further, the cumulative addition unit 2223 calculates R' defined by mathematical equation 8. That is, the cumulative addition unit 2223 performs a cumulative addition of c(k,1,1) and calculates R'.

$$R' = \sum_{k=K_{min}}^{K_{max}-1} |c(k,1,1)|$$ [Mathematical Equation 8]

With reference to the respective covariance deviations $R_H$, $R_L$, and R' of the frequency ranges, which have been calculated in the deviation calculation unit 222, the ACI determination unit 223 determines whether or not conditions 1a and 2a described below are satisfied. Here, the ACI determination unit 223 includes a multiplier (×) 2231, a comparator 2232, and a determination unit 2233, and determines whether or not conditions 1a and 2a are satisfied, with reference to $R_H$, $R_L$, and R' and a predetermined threshold value Th.

Condition 1a: The ratio between $R_H$ and R' ($R_H/R'$) is smaller than a predetermined threshold value and the ratio between $R_L$ and R' ($R_L/R'$) is larger than the predetermined threshold value Th.

Condition 2a: The ratio between $R_H$ and R' ($R_H$/R') is larger than the predetermined threshold value and the ratio between $R_L$ and R' ($R_L$/R') is smaller than the predetermined threshold value Th.

The ACI determination unit 223 determines that adjacent-channel interference on the low-frequency side is present when condition 1a is satisfied. When condition 2a is satisfied, the ACI determination unit 223 determines that adjacent-channel interference on the high-frequency side is present. When neither condition 1a nor condition 2a is satisfied, the ACI determination unit 223 determines that no adjacent-channel interference is present.

In the second embodiment, the deviation calculation unit 222 calculates R' defined by mathematical equation 8 instead of R defined by mathematical equation 6, and the ACI determination unit 223 performs the determination of conditions 1a and 2a using R' instead of R to estimate the presence of adjacent-channel interference.

In the second embodiment, similar to the first embodiment, the presence of adjacent-channel interference may be determined with few detection errors and high reliability while suppressing the influence of noise by performing the determination of adjacent-channel interference using the values of $R_H$ and $R_L$.

Further, in the second embodiment, R' is used instead of R in the determination of adjacent-channel interference. Since the change in magnitude of R', which is affected by the interference power, is small, compared to R, the presence of adjacent-channel interference may be determined with few detection errors and high reliability when the interference power is relatively small.

Instead of using the configuration in FIG. 7 for the computation of R', a predetermined constant may be used as a substitute value of R'. Further, although R' is computed using the output value of the DFT unit 107, power calculated from the output of an AD converter may be used as a substitute of R'. In addition, temporary R' is calculated according to each of the outputs of the DFT units 107 and 108 and the average value may be used as R'.

[Third Embodiment]

Figure 8:
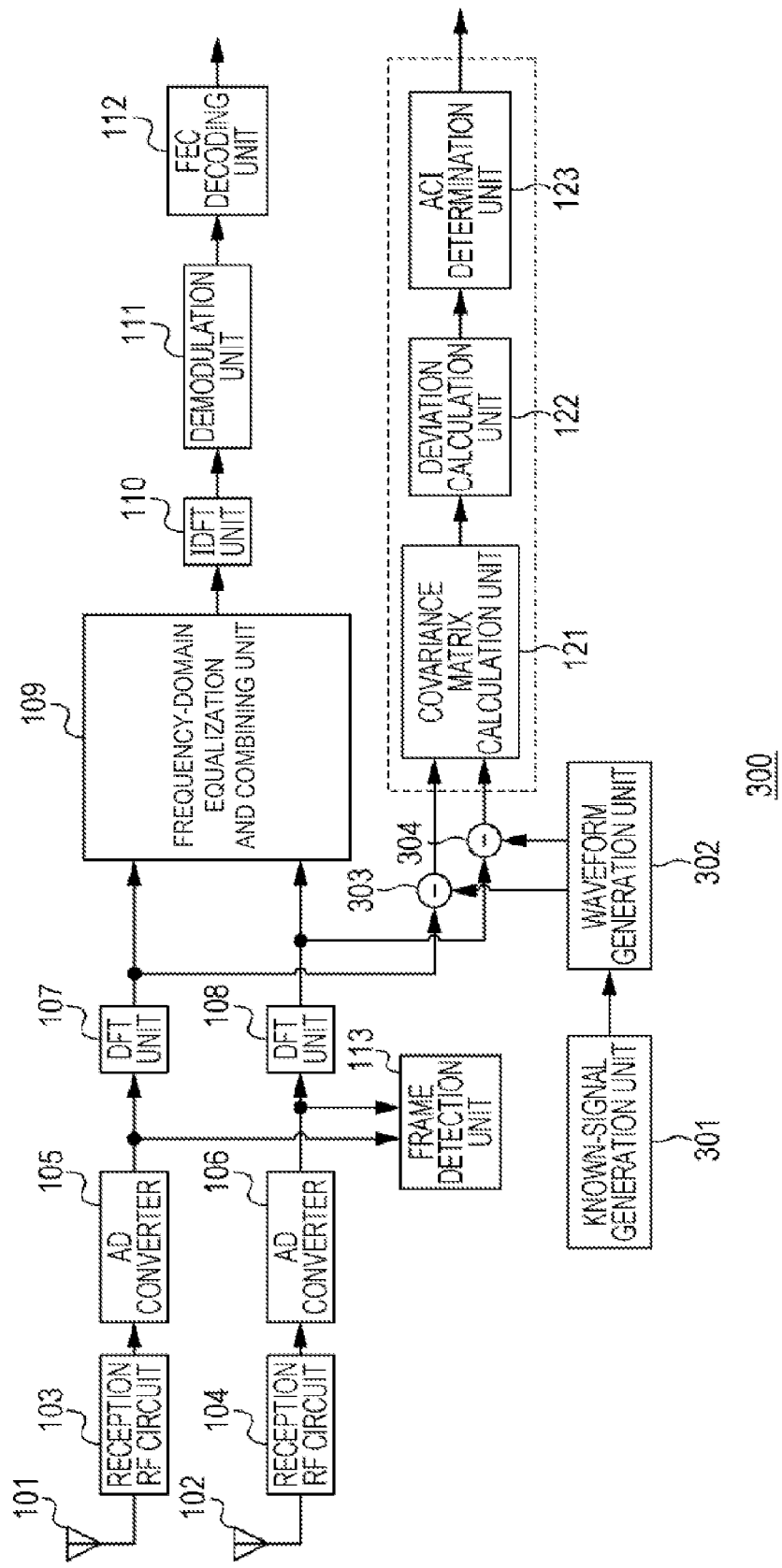
FIG. 8 illustrates a configuration of a radio communication apparatus according to a third embodiment of the present disclosure.

FIG. 8 illustrates a configuration of a radio communication apparatus according to a third embodiment of the present disclosure. In FIG. 8, the same reference numerals or symbols are given to the constituents the same as the constituents in the first embodiment illustrated in FIG. 1 and the explanation on such constituents is omitted.

In addition to the configuration in FIG. 1, a radio communication apparatus 300 includes a known-signal generation unit 301, a waveform generation unit 302, and subtractors (–) 303 and 304. The known-signal generation unit 301, the waveform generation unit 302, and the subtractors 303 and 304 implement a function of a replica-signal subtraction unit. The radio communication apparatus 300 does not include switches 114 and 115.

In the radio communication apparatus 300, a frame detection unit 113 determines that a known signal is received and determines the type of the known signal. For example, among radio signals based on the IEEE802.11ad standard, a preamble and a guard interval are known as the known signals.

The known-signal generation unit 301 generates a signal the same as the known signal that is currently received.

The waveform generation unit 302 performs waveform conversion based on propagation-path characteristics on the signal generated by the known-signal generation unit 301, and outputs the resultant signal as a replica signal of a desired signal. The replica signal is a frequency-domain signal. Since the propagation-path characteristics include values different for each reception antenna, the waveform generation unit 302 generates two different sequences of the replica signals for the two receiver chains.

The subtractors 303 and 304 subtract the replica signals from the reception signals. As a result of the subtraction, signals mainly containing interference waves and noise are obtained. When the obtained signals are input to a covariance calculation unit 121 and covariance is calculated, similar to the first embodiment, the presence or absence of adjacent-channel interference may be determined.

In the third embodiment, since the signals obtained by subtracting the replica signals from the reception signals, which are signals mainly containing interference waves and noise, are used to calculate the covariance, the presence of adjacent-channel interference may be determined even while receiving a desired wave.

As described above, the signal obtained by subtracting the replica signal from the reception signal, which is a signal mainly containing an interference wave and noise, may occasionally contain an error caused in the subtraction, depending on the accuracy of the replica signal. The error is observed in the covariance calculation unit 121 as equivalent to noise. As described in the first embodiment, since the influence of noise is reduced because of the covariance calculation unit 121, a deviation calculation unit 122, and an ACI determination unit 123, the presence of adjacent-channel interference may be determined even when an error is caused by the replica signal.

The other advantages are similar to the advantages of the first embodiment, and the presence of adjacent-channel interference may be determined with few detection errors and high reliability while suppressing the influence of noise.

[Fourth Embodiment]

Figure 9:
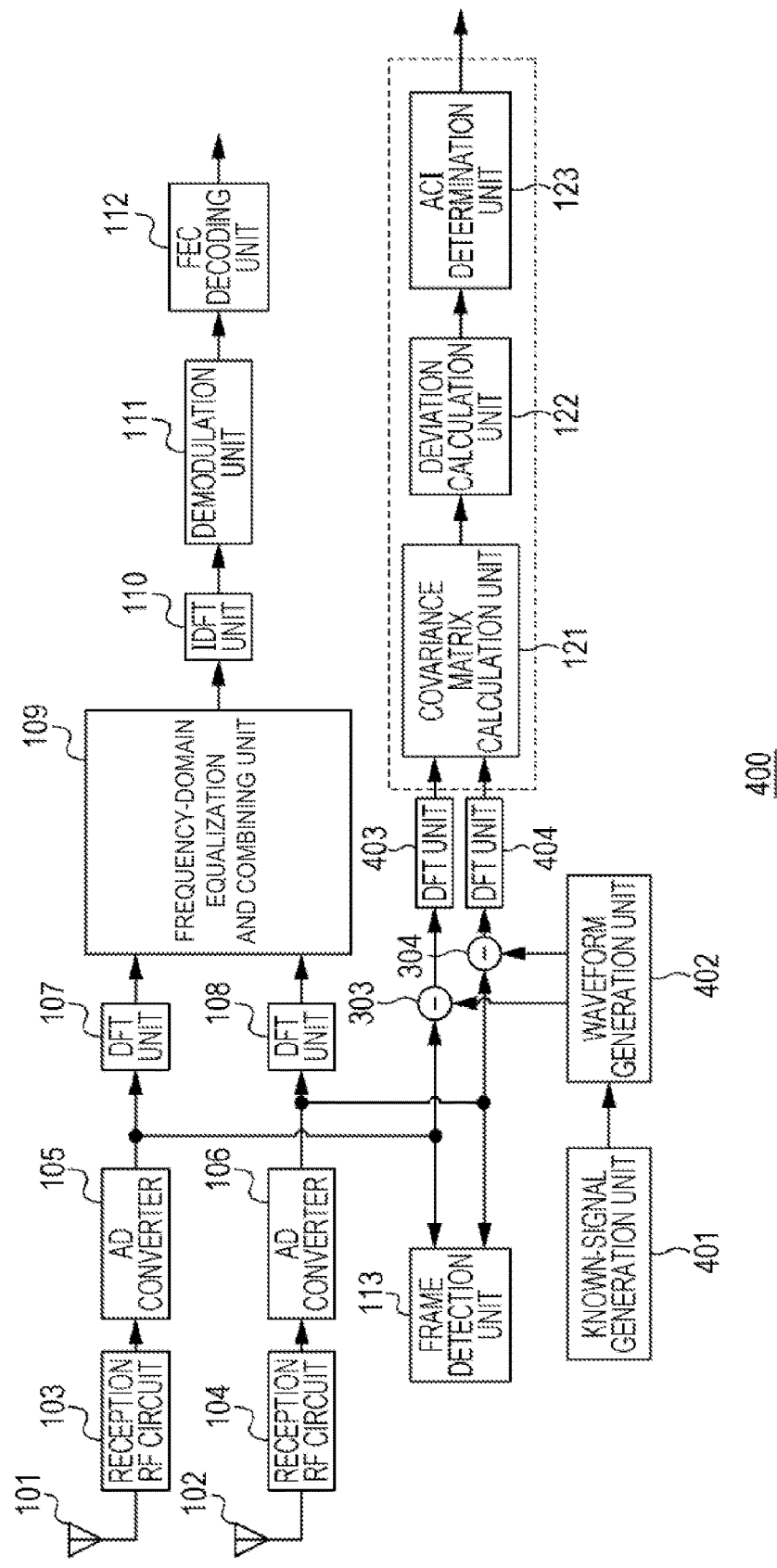
FIG. 9 illustrates a configuration of a radio communication apparatus according to a fourth embodiment of the present disclosure.

FIG. 9 illustrates a configuration of a radio communication apparatus according to a fourth embodiment of the present disclosure. In FIG. 9, the same reference numerals or symbols are given to the constituents the same as the constituents in the third embodiment illustrated in FIG. 8 and the explanation on such constituents is omitted.

A radio communication apparatus 400 includes a known-signal generation unit 401, a waveform generation unit 402, and DFT units 403 and 404. The known-signal generation unit 401, the waveform generation unit 402, and subtractors (–) 303 and 304 implement a function of a replica-signal subtraction unit.

The known-signal generation unit 401 generates a signal the same as a known signal that is currently received. The generated known signal is a time-domain signal.

The waveform generation unit 402 performs waveform conversion based on propagation-path characteristics on the signal generated by the known-signal generation unit 401, and outputs the resultant signal as a replica signal of a desired signal. The replica signal is a time-domain signal.

The subtractors 303 and 304 subtract the replica signals from the reception signals. The fourth embodiment is different from the third embodiment in that the generation and subtraction of the replica signal are performed using a time-domain signal.

Each of the DFT units 403 and 404 performs a discrete Fourier transform on the resultant signal after the subtraction of the replica signal and obtain a frequency-domain signal. Similar to the first to third embodiments, the determination of adjacent-channel interference is performed in an ACI detection unit according to the obtained signal.

The DFT units 403 and 404 may employ a DFT size different from the DFT size of the DFT units 107 and 108 for reception signals. For example, the DFT size of the DFT units 403 and 404 is 64 and the DFT size of the DFT units 107 and 108 is 128.

In the fourth embodiment, the amount of power consumption needed for the determination of adjacent-channel interference may be reduced by decreasing the DFT size of the DFT units 403 and 404.

The other advantages are similar to the advantages of the third embodiment, and the presence of adjacent-channel interference may be determined even while receiving a desired wave. Further, the presence of adjacent-channel interference may be determined with few detection errors and high reliability while suppressing the influence of noise.

[Fifth Embodiment]

Figure 10:
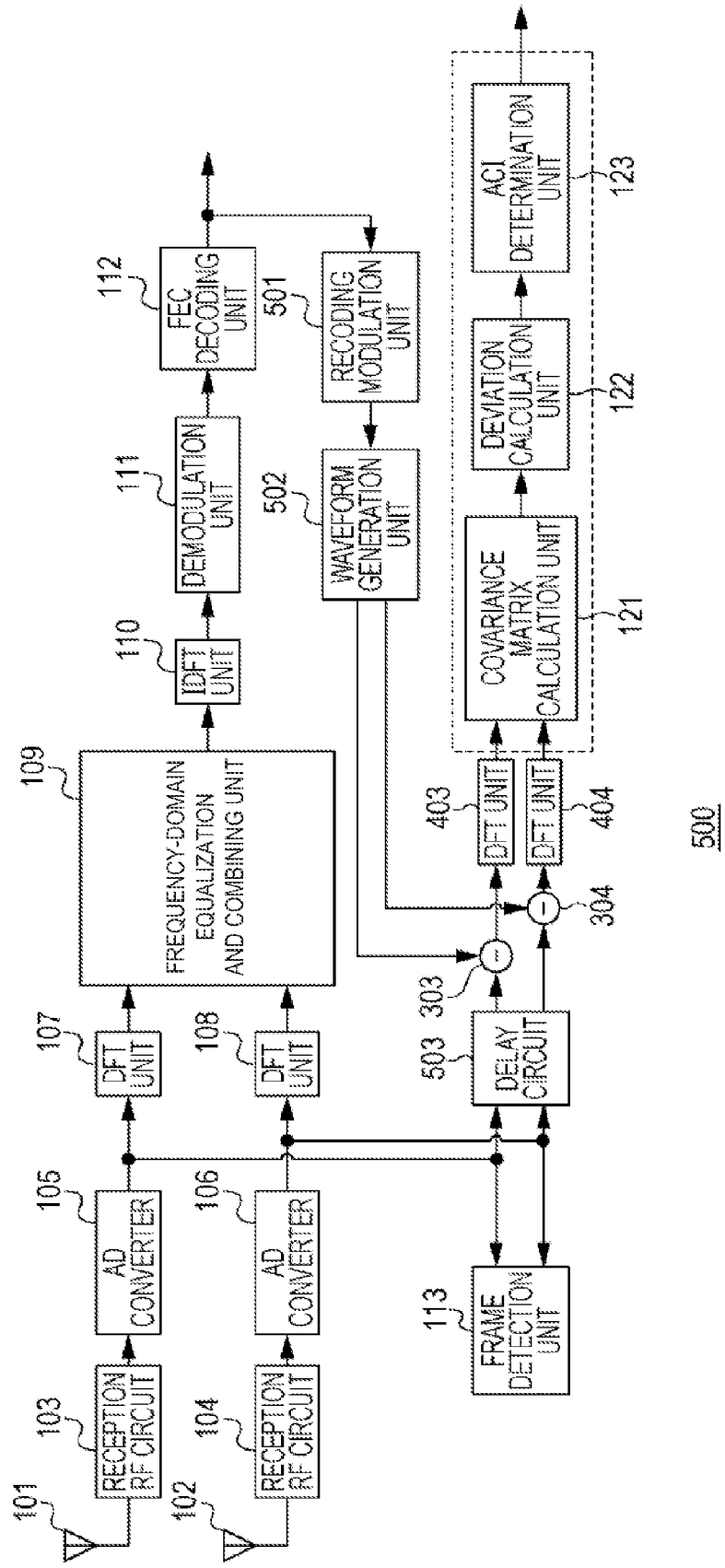
FIG. 10 illustrates a configuration of a radio communication apparatus according to a fifth embodiment of the present disclosure.
Figure 11:
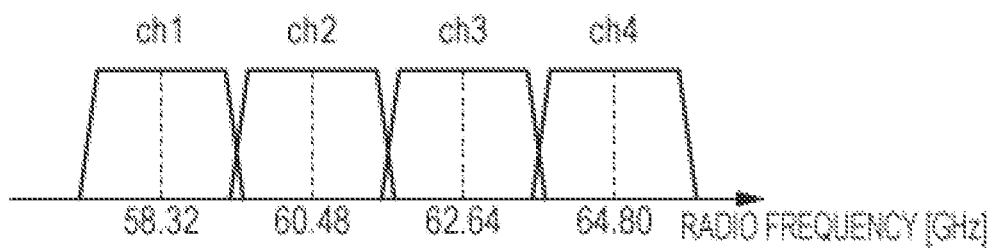
FIG. 11 illustrates allocation of radio channels used in IEEE802.11ad.

FIG. 10 illustrates a configuration of a radio communication apparatus according to a fifth embodiment of the present disclosure. In FIG. 10, the same reference numerals or symbols are given to the constituents the same as the constituents in the fourth embodiment illustrated in FIG. 9 and the explanation on such constituents is omitted.

A radio communication apparatus 500 includes a recoding modulation unit 501, a waveform generation unit 502, and a delay circuit 503. The recoding modulation unit 501, the waveform generation unit 502, the delay circuit 503, and subtractors (−) 303 and 304 implement a function of a replica-signal subtraction unit.

The recoding modulation unit 501 performs error-correction coding again and then performs modulation on the data that has undergone the error-correction decoding of an FEC decoding unit 112, and reproduces a transmission signal.

Instead of performing the error-correction coding again, systematic bits of the decoded data may be extracted to perform the modulation. The systematic bits are bit parts with values that remain unchanged both before and after performing the error-correction coding again.

The waveform generation unit 502 uses the recoded data and generates a replica signal of a desired signal according to the data and propagation-path characteristics.

According to the fifth embodiment, the determination of adjacent-channel interference may be performed not only in receiving a known pattern but may be also performed at a desired timing in receiving data.

When an error is included in the FEC decoding result in receiving data, an error occurs in the replica signal. Although the error of the replica signal is observed as equivalent to noise, similar to the error described in the third embodiment, the influence of noise may be reduced in an ACI detection unit and the presence of adjacent-channel interference may be determined even when the replica signal contains an error.

The other advantages are similar to the advantages of the fourth embodiment, and the presence of adjacent-channel interference may be determined with few detection errors and high reliability.

As described above, the radio communication apparatus according to the present embodiment enables adjacent-channel interference to be detected with high reliability when noise is present.

Various aspects of the embodiments according to the present disclosure include what is described below.

A radio communication apparatus of the present disclosure includes a frequency-domain transformer that performs a frequency-domain transform on each of a plurality of reception signals received at a plurality of receiver chains and generates a plurality of frequency-domain signals, a covariance calculator that calculates covariance of the plurality of frequency-domain signals, a cumulative value calculator that calculates a cumulative value of the covariance, and a determiner that determines presence or absence of adjacent-channel interference using the cumulative value of the covariance.

The radio communication apparatus of the present disclosure is the above-described radio communication apparatus, where the cumulative value calculator calculates a first cumulative value obtained by cumulating covariance in a first frequency range of a radio channel of the plurality of reception signals and calculates a second cumulative value obtained by cumulating covariance in a second frequency range of the radio channel of the plurality of reception signals, the second frequency range being different from the first frequency range, and the determiner determines presence or absence of adjacent-channel interference according to deviation of the covariance in the radio channel of the reception signal using the first cumulative value and the second cumulative value.

The radio communication apparatus of the present disclosure is the above-described radio communication apparatus, where the determiner calculates each of ratios of the first cumulative value and the second cumulative value to a cumulative value of covariance throughout the radio channel of the plurality of reception signals, and determines presence or absence of adjacent-channel interference.

The radio communication apparatus of the present disclosure is the above-described radio communication apparatus, where the determiner calculates each of ratios of the first cumulative value and the second cumulative value to a cumulative value of a power spectrum throughout the radio channel of the plurality of reception signals, and determines presence or absence of adjacent-channel interference.

The radio communication apparatus of the present disclosure is the above-described radio communication apparatus, where in the radio channel of the plurality of reception signals, the first frequency range is a partial frequency range including a frequency lower than a channel center frequency, and the second frequency range is a partial frequency range including a frequency higher than the channel center frequency, the determiner determines that adjacent-channel interference on a lower-frequency side is present when the first cumulative value or a value calculated based on the first cumulative value is larger than a predetermined threshold value, and the determiner determines that adjacent-channel interference on a higher-frequency side is present when the second cumulative value or a value calculated based on the second cumulative value is larger than the predetermined threshold value.

The radio communication apparatus of the present disclosure is the above-described radio communication apparatus further including a desired-signal determiner that determines whether or not a desired signal is present in the plurality of reception signals, where when the desired signal is not received, the covariance calculator calculates the covariance, the cumulative value calculator calculates the cumulative value of the covariance, and the determiner determines presence or absence of adjacent-channel interference using the cumulative value of the covariance.

The radio communication apparatus of the present disclosure is the above-described radio communication apparatus further including a replica-signal subtracter that subtracts a plurality of replica signals of a plurality of desired signals from the plurality of reception signals or the plurality of frequency-domain signals respectively, where the covariance calculator calculates covariance based on the plurality of frequency-domain signals from which the plurality of replica signals are subtracted, and the determiner determines presence or absence of adjacent-channel interference using a cumulative value of the covariance calculated by removing the plurality of replica signals.

An interference detection method of the present disclosure includes performing a frequency-domain transform on each of a plurality of reception signals received at a plurality of receiver chains and generating a plurality of frequency-domain signals, calculating covariance of the plurality of frequency-domain signals, calculating a cumulative value of the covariance, and determining presence or absence of adjacent-channel interference using the cumulative value of the covariance.

The interference detection method of the present disclosure is the above-described interference detection method, which further includes calculating a first cumulative value obtained by cumulating covariance in a first frequency range of a radio channel of the plurality of reception signals and calculating a second cumulative value obtained by cumulating covariance in a second frequency range of the radio channel of the plurality of reception signals, the second frequency range being different from the first frequency range, and determining presence or absence of adjacent-channel interference according to deviation of the covariance in the radio channel of the reception signals using the first cumulative value and the second cumulative value.

Although various embodiments are described above with reference to the drawings, it is needless to mention that the present disclosure is not limited to these examples. A person skilled in the art may obviously arrive at variations or modifications within the scope recited in the claims, and the variations or modifications should be understood as belonging to the technical scope of the present disclosure as a matter of course. Also, the constituents of the above-described embodiments may be combined as desired within the scope not departing from the spirit of the disclosure.

Although in each of the embodiments above, the present disclosure is described by taking the configurations using hardware as examples, the present disclosure may be also implemented using software in conjunction with hardware.

Each of the functional blocks used in the description of the embodiments above is typically implemented as large-scale integration (LSI), which is an integrated circuit. The individual functional blocks may be made as one chip, or may be made as one chip so as to include part or all of each of the functional blocks. Depending on the degree of the integration, the LSI used here may be also referred to as an integrated circuit (IC), system LSI, super LSI, or ultra LSI.

In addition, the circuit-integrating technique is not limited to the LSI, a personal circuit or a general-purpose processor may be used for the implementation. After manufacturing the LSI, a field-programmable gate array (FPGA), which is programmable, or a reconfigurable processor, which is capable of reconfiguring the connection and setting of circuit cells inside LSI, may be utilized.

Moreover, when a circuit-integrating technique that replaces the LSI is brought by the advance of a semiconductor technique or another derivative technique, of course, the integration of the functional blocks may be performed by another technique. Application of biotechnology and the like are possible.

The present disclosure may be represented as an interference detection method performed in a radio communication apparatus. Further, the present disclosure may be also represented as an interference detection apparatus, which has a function to perform an interference detection method, or a program for causing a computer to operate the interference detection method or the interference detection apparatus.

That is, the present disclosure may be represented in any category of apparatuses, methods, and programs.

The present disclosure has advantages, which enable the presence or absence of adjacent-channel interference to be determined with high reliability and is useful as, for example, a radio communication apparatus that performs short-distance radio communication, an interference detection method used for the radio communication apparatus, and the like.

What is claimed is:

1. A radio communication apparatus, comprising:
frequency-domain transforming circuitry, which, in operation, performs a frequency-domain transform on each of a plurality of reception signals received at a plurality of receiver chains and generates a plurality of frequency-domain signals;
covariance calculating circuitry, which, in operation, calculates a covariance matrix of the plurality of frequency-domain signals;
cumulative value calculating circuitry, which, in operation, calculates a cumulative value of absolute values of off-diagonal elements in the covariance matrix;
determining circuitry, which, in operation, determines presence or absence of adjacent-channel interference using the cumulative value of the absolute values of the off-diagonal elements in the covariance matrix; and
interference control circuitry, which, in operation, controls adjacent-channel interference in response to a determination that adjacent-channel interference is present.

2. The radio communication apparatus according to claim 1, wherein
the cumulative value calculating circuitry, in operation, calculates a first cumulative value obtained by cumulating the absolute values of the off-diagonal elements in the covariance matrix in a first frequency range of a radio channel of the plurality of reception signals and calculates a second cumulative value obtained by cumulating the absolute values of the off-diagonal elements in the covariance matrix in a second frequency range of the radio channel of the plurality of reception signals, the second frequency range being different from the first frequency range, and
the determining circuitry, in operation, determines presence or absence of adjacent-channel interference according to deviation of the absolute values of the off-diagonal elements in the covariance matrix in the radio channel of the reception signal using the first cumulative value and the second cumulative value.

3. The radio communication apparatus according to claim 2, wherein
the determining circuitry, in operation, calculates each of ratios of the first cumulative value and the second cumulative value to a cumulative value of the absolute values of the off-diagonal elements in the covariance matrix throughout the radio channel of the plurality of reception signals, and determines presence or absence of adjacent-channel interference.

4. The radio communication apparatus according to claim 2, wherein
the determining circuitry, in operation, calculates each of ratios of the first cumulative value and the second cumulative value to a cumulative value of a power spectrum throughout the radio channel of the plurality of reception signals, and determines presence or absence of adjacent-channel interference.

5. The radio communication apparatus according to claim 2, wherein
in the radio channel of the plurality of reception signals, the first frequency range is a partial frequency range including a frequency lower than a channel center frequency, and the second frequency range is a partial frequency range including a frequency higher than the channel center frequency,
the determining circuitry, in operation, determines that adjacent-channel interference on a lower-frequency side is present when the first cumulative value or a value calculated based on the first cumulative value is larger than a determined threshold value, and
the determining circuitry, in operation, determines that adjacent-channel interference on a higher-frequency side is present when the second cumulative value or a value calculated based on the second cumulative value is larger than the determined threshold value.

6. The radio communication apparatus according to claim 1, comprising:
a desired-signal determining circuit, which, in operation, determines whether or not a desired signal is present in the plurality of reception signals, wherein
when the desired signal is not received,
the covariance calculating circuitry, in operation, calculates the covariance,
the cumulative value calculating circuitry, in operation, calculates the cumulative value of the absolute values of the off-diagonal elements in the covariance matrix, and
the determining circuitry, in operation, determines presence or absence of adjacent-channel interference using the cumulative value of the absolute values of the off-diagonal elements in the covariance matrix.

7. The radio communication apparatus according to claim 1, comprising:
replica-signal subtracting circuitry, which, in operation, subtracts a plurality of replica signals of a plurality of desired signals from the plurality of reception signals or the plurality of frequency-domain signals respectively, wherein
the covariance calculating circuitry, in operation, calculates covariance based on the plurality of frequency-domain signals from which the plurality of replica signals are subtracted, and
the determining circuitry, in operation, determines presence or absence of adjacent-channel interference using a cumulative value of the absolute values of the off-diagonal elements in the covariance matrix calculated by removing the plurality of replica signals.

8. The radio communication apparatus of claim 1 wherein the plurality of reception signals comprise data signals.

9. An interference detection method, comprising:
performing a frequency-domain transform on each of a plurality of reception signals received at a plurality of receiver chains and generating a plurality of frequency-domain signals;
calculating a covariance matrix of the plurality of frequency-domain signals;
calculating a cumulative value of absolute values of off-diagonal elements in the covariance matrix;
determining presence or absence of adjacent-channel interference using the cumulative value of the absolute values of the off-diagonal elements in the covariance matrix; and
controlling adjacent-channel interference in response to a determined presence of adjacent-channel interference.

10. The interference detection method according to claim 9, comprising:
calculating a first cumulative value obtained by cumulating the absolute values of the off-diagonal elements in the covariance matrix in a first frequency range of a radio channel of the plurality of reception signals and calculating a second cumulative value obtained by cumulating the absolute values of the off-diagonal elements in the covariance matrix in a second frequency range of the radio channel of the plurality of reception signals, the second frequency range being different from the first frequency range; and
determining presence or absence of adjacent-channel interference according to deviation of the absolute values of the off-diagonal elements in the covariance matrix in the radio channel of the reception signals using the first cumulative value and the second cumulative value.

11. The interference detection method of claim 9 wherein the plurality of reception signals comprise data signals.

* * * * *